(12) United States Patent
Araki et al.

(10) Patent No.: US 12,328,062 B2
(45) Date of Patent: Jun. 10, 2025

(54) INVERTER DEVICE

(71) Applicant: SANDEN CORPORATION, Isesaki (JP)

(72) Inventors: Yushi Araki, Isesaki (JP); Tatsuki Kashihara, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 206 days.

(21) Appl. No.: 18/260,834

(22) PCT Filed: Dec. 17, 2021

(86) PCT No.: PCT/JP2021/046679
§ 371 (c)(1),
(2) Date: Jul. 10, 2023

(87) PCT Pub. No.: WO2022/158195
PCT Pub. Date: Jul. 28, 2022

(65) Prior Publication Data
US 2024/0072645 A1 Feb. 29, 2024

(30) Foreign Application Priority Data
Jan. 21, 2021 (JP) .................. 2021-007851

(51) Int. Cl.
H02M 1/084 (2006.01)
H02M 1/38 (2007.01)
H02M 7/5387 (2007.01)

(52) U.S. Cl.
CPC ......... H02M 1/385 (2021.05); H02M 7/5387 (2013.01)

(58) Field of Classification Search
CPC .... H02M 1/084; H02M 1/385; H02M 7/5387; H02M 7/53871
See application file for complete search history.

(56) References Cited

U.S. PATENT DOCUMENTS

2022/0320995 A1* 10/2022 Kashihara ............... H02P 27/08
2023/0412092 A1* 12/2023 Kashihara ............. H02M 1/123

FOREIGN PATENT DOCUMENTS

JP 2002-071731 A 3/2002
JP 2019-075964 A 5/2019
JP 2020-137329 A 8/2020

OTHER PUBLICATIONS

Japan Patent Office; Notice of Reasons for Refusal issued in Japanese Patent Application No. 2021-007851, dated Aug. 6, 2024.
(Continued)

Primary Examiner — Adolf D Berhane
(74) Attorney, Agent, or Firm — Baker Botts L.L.P.

(57) ABSTRACT

The invention provides an inverter device which effectively cancels the generation of common mode noise associated with dead-time effects and misjudgement of the polarity of a phase current at switching in the case where a fluctuation in a neutral point potential of a motor is suppressed by canceling a change in a phase voltage with another change in the phase voltage. A phase voltage command operation unit 33 of a control device includes a phase current prediction part 41 which predicts a phase current at a switching timing of each phase, and a correction control part 42 which corrects a switching operation so as to cancel a change in the phase voltage applied to the motor with another change in the phase voltage, based on the phase current of each phase at the switching timing predicted by the phase current prediction part 41.

14 Claims, 9 Drawing Sheets

(56) References Cited

OTHER PUBLICATIONS

Japan Patent Office, International Search Report issued in International Application No. PCT/JP2021/046679, mailed Mar. 8, 2022.

* cited by examiner

WHEN iu IS ALMOST 0, iv<0, iw>0

INVERTER DEVICE

CROSS-REFERENCE TO RELATED APPLICATIONS

This application is a U.S. National Stage Patent Application under 37 U.S.C. § 371 of International Patent Application No. PCT/JP2021/046679, filed Dec. 17, 2021, which claims the benefit of Japanese Patent Application No. JP 2021-007851, filed Jan. 21, 2021, the disclosures of each of which are incorporated herein by reference in their entirety.

TECHNICAL FIELD

The present invention relates to an inverter device which applies a three-phase AC voltage to a motor by an inverter circuit to drive the motor.

BACKGROUND ART

Due to recent environmental problems, for example, hybrid vehicles and electric vehicles have become popular even in the automobile industry. In a vehicular air conditioner for air-conditioning the interiors of these vehicles, an electric compressor driven by a motor instead of conventional belt drive is used. In this case, since the electric compressor is required to have the same size as that of the conventional belt-driven compressor, a motor and an inverter device which drives it need to be miniaturized.

With the purpose of miniaturization of the inverter device, it is required to achieve both miniaturization of a noise filter which is one of passive components, and EMI performance. In order to achieve it, various attempts have heretofore been made to reduce conduction noise. A main cause of the conduction noise includes common mode noise due to a fluctuation in the neutral point potential (common mode voltage) of the motor caused by PWM operation.

Therefore, there has been proposed control of adding correction to a voltage command value of each phase to synchronize switching timings of upper and lower arm switching elements of each of U, V, and V phases, which constitute an inverter circuit, and canceling a change in the phase voltage applied to a motor with another change in the phase voltage to thereby prevent the neutral point potential of the motor from fluctuating (refer to, for example, Patent Document 1).

CITATION LIST

Patent Document

Patent Document 1: Japanese Patent Application Laid-Open No. 2020-137329

SUMMARY OF THE INVENTION

Problems to be Solved by the Invention

Here, the fluctuation timing of the neutral point potential of the motor is generated by either operation of upper or lower arm switching elements provided with a dead time, but this timing changes depending on the polarity of a phase current. That is, when the direction of the phase current is the direction (positive) thereof flowing into the motor, the phase voltage changes at the timing when the upper arm switching element is turned OFF, but when the direction of the phase current is the direction (negative) thereof flowing out of the motor, the phase voltage changes at the timing when the lower arm switching element is turned OFF.

On the other hand, a problem arises in that since the polarity of the phase current continues to change due to the influence of ripples (vibrations) when the phase current is near zero A (amperes), the timing of canceling a change in the phase voltage with another change in the phase voltage is shifted by a dead time (actually, the delay time of the switching element is also added to the dead time, the same shall apply hereinafter) in the case where the phase current at a sampling timing and the phase current at a switching timing are different in polarity, and hence the neutral point potential fluctuates, so that common mode noise cannot be suppressed.

The present invention has been made to solve such conventional technical problems. It is an object of the present invention to provide an inverter device capable of effectively eliminating or suppressing the influence of a dead time and the generation of common mode noise accompanying misjudgement of the polarity of a phase current at switching when a change in the phase voltage is canceled with another change in the phase voltage to suppress a fluctuation in a neutral point potential of a motor.

Means for Solving the Problems

An inverter device of the present invention includes an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output, and a control device which controls switching of the upper and lower arm switching elements of each phase by providing a dead time. The inverter device is characterized in that the control device includes a phase current prediction part which predicts a phase current at a switching timing of each phase, and a correction control part which corrects a switching operation so as to cancel a change in the phase voltage applied to the motor with another change in the phase voltage, based on the phase current of each phase at the switching timing predicted by the phase current prediction part.

The inverter device of the invention of claim 2 is characterized in that in the above invention, the control device includes a voltage command calculation part which calculates a voltage command value of each phase, the phase current prediction part predicts a phase current at a switching timing when the upper arm switching element or the lower arm switching element brought to an ON state by the voltage command value of each phase calculated by the voltage command calculation part is turned OFF, and the correction control part corrects the voltage command value of each phase calculated by the voltage command calculation part, based on the phase current of each phase at the switching timing predicted by the phase current prediction part and synchronizes the switching timings of each phase to cancel a change in the phase voltage applied to the motor with another change in the phase voltage.

The inverter device of the invention of claim 3 is characterized in that in the above respective inventions, the control device includes a phase current detection part which samples the phase current of each phase, and the phase current prediction part predicts the phase current of each phase at the switching timing from the phase current sampled by the phase current detection part and the amount of increase or decrease in the phase current from a sampling timing provided to sample the phase current to the switching timing.

The inverter device of the invention of claim 4 is characterize in that in the above invention, the phase current prediction part predicts the phase current of each phase at the switching timing, based the phase current sampled by the phase current detection part, an ON time of the upper arm switching element or the lower arm switching element of each phase, a back electromotive force of each phase of the motor, a neutral point potential of the motor, and an inductance of each phase of the motor.

The inverter device of the invention of claim 5 is characterized in that in the above invention, the phase current prediction part predicts the phase current of each phase at the switching timing using the following formula (I):

[Math. 1]

$$i_{uvw}(t+t_{uvw}) = i_{uvw}(t) + \frac{1}{L_{uvw}} \left\{ \frac{\text{sgn}(V_{uvw})V_{dc}}{2} - (e_{uvw} + v_{np}) \right\} t_{uvw} \quad (I)$$

where $i_{uvw}$ ($t+t_{uvw}$) indicates the phase currents of the U phase, V phase, and W phase at the switching timing, $t_{uvw}$ indicates the ON times of the upper arm switching elements or lower arm switching elements of the U phase, V phase, and W phase, $i_{uvw}$ (t) indicates the sampled phase currents of the U phase, V phase, and W phase, $L_{uvw}$ indicates the inductances of the U phase, V phase, and W phase of the motor, $V_{dc}$ indicates a DC link voltage, $e_{uvw}$ indicates the back electromotive forces of the U phase, V phase, and W phase of the motor, $V_{np}$ indicates the neutral point potential of the motor, and sgn ($V_{uvw}$) indicates a sign function of each phase voltage, which becomes 1 when the phase voltage is $V_{dc}$ and becomes −1 when the phase voltage is 0.

The inverter device of the invention of claim 6 is characterized in that in the above respective inventions, the correction control part shifts the switching timing so that the phase voltage which changes due to switching and another phase voltage which rises or falls to cancel the change in the phase voltage intersect at the DC link voltage $V_{dc}/2$.

The inverter device of the invention of claim 7 is characterized in that in the above invention, the correction control part shifts the switching timing of the phase larger in the absolute value of the phase current.

The inverter device of the invention of claim 8 is characterized in that in the invention of claim 6 or 7, the correction control part does not shift the switching timing for the phase smallest in the magnitude of the absolute value of the phase current.

Advantageous Effect of the Invention

According to the present invention, there is provided an inverter device including an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output, and a control device which controls switching of the upper and lower arm switching elements of each phase by providing a dead time. In the inverter device, the control device has a phase current prediction part which predicts a phase current at a switching timing of each phase, and a correction control part which corrects a switching operation so as to cancel a change in the phase voltage applied to the motor with another change in the phase voltage, based on the phase current of each phase at the switching timing predicted by the phase current prediction part. Therefore, it is possible to perform the correction of a more accurate switching operation, based on the polarity of the phase current at the switching timing.

Thus, it is possible to eliminate the effects of a dead time and thereby accurately cancel a change in the phase voltage with another change in the phase voltage. Therefore, it is possible to extremely effectively eliminate or suppress the generation of common mode noise due to a fluctuation in the neutral point potential.

More specifically, as in the invention of claim 2, the control device includes a voltage command calculation part which calculates a voltage command value of each phase, the phase current prediction part predicts a phase current at a switching timing when the upper arm switching element or the lower arm switching element brought to an ON state by the voltage command value of each phase calculated by the voltage command calculation part is turned OFF, and the correction control part corrects the voltage command value of each phase calculated by the voltage command calculation part, based on the phase current of each phase at the switching timing predicted by the phase current prediction part and synchronizes the switching timings of each phase to cancel a change in the phase voltage applied to the motor with another change in the phase voltage.

Further, as in the invention of claim 3, the control device includes a phase current detection part which samples the phase current of each phase. The phase current prediction part predicts the phase current of each phase at the switching timing from the phase current sampled by the phase current detection part and the amount of increase or decrease in the phase current from a sampling timing provided to sample the phase current to the switching timing.

In this case, as in the invention of claim 4, if the phase current prediction part predicts the phase current of each phase at the switching timing, based the phase current sampled by the phase current detection part, an ON time of the upper arm switching element or the lower arm switching element of each phase, a back electromotive force of each phase of the motor, a neutral point potential of the motor, and an inductance of each phase of the motor, it is possible to accurately predict the phase current at the switching timing from the sampled phase current.

Specifically, as in the invention of claim 5, the phase current prediction part predicts the phase current at the switching timing using the above-mentioned formula (I). Consequently, it is possible to more accurately predict the phase current at the switching timing.

Incidentally, as a change in the phase voltage, the slope thereof actually changes depending on the polarity and magnitude of the phase current. Therefore, as in the invention of claim 6, if the correction control part shifts the switching timing so that the phase voltage which changes due to switching and another phase voltage which rises or falls to cancel the change in the phase voltage intersect at the DC link voltage $V_{dc}/2$, it is possible to more accurately cancel the change in the phase voltage with another change in the phase voltage and more effectively suppress a fluctuation in the neutral point potential.

In this case, since the slope of the phase voltage change is less likely to change even if the phase current having a larger absolute value is shifted, as in the invention of claim 7, the correction control part shifts the switching timing of the phase larger in the absolute value of the phase current.

Consequently, it is possible to more accurately intersect the phase voltages at the DC link voltage $V_{dc}/2$.

Since there is a high possibility that the way in which the phase voltage changes will change due to the shift in the case of the phase in which the phase current is close to zero A (amperes) in reverse, the correction control part may preferably not shift the switching timing for the phase smallest in the magnitude of the absolute value of the phase current as in the invention of claim 8.

MODE FOR CARRYING OUT THE INVENTION

Hereinafter, an embodiment of the present invention will be described in detail with reference to the drawings. An inverter device 1 of the embodiment is mounted on a so-called inverter-integrated electric compressor which drives a compression mechanism by a motor 8. The electric compressor constitutes a refrigerant circuit of a vehicular air conditioner which air-conditions the interior of an electric vehicle or a hybrid vehicle, for example.

(1) Configuration of Inverter Device 1

Figure 1:
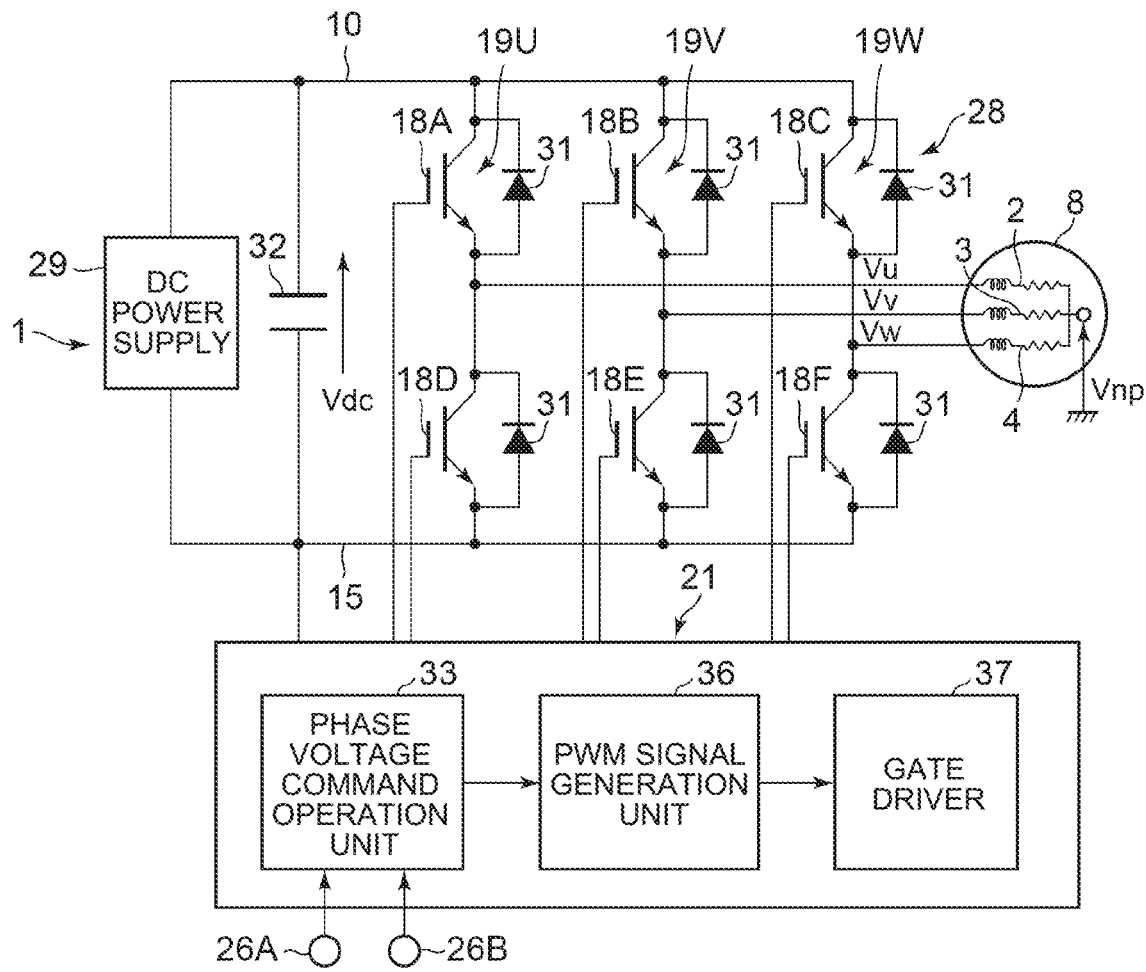
FIG. 1 is an electric circuit diagram of an inverter device according to one embodiment of the present invention.

In FIG. 1, the inverter device 1 includes a three-phase inverter circuit 28 and a control device 21. The inverter circuit 28 is a circuit which converts a DC voltage of a DC power supply (vehicle battery: for example, 300 V) 29 into a three-phase AC voltage and applies it to the motor 8. This inverter circuit 28 has a U-phase half bridge circuit 19U, a V-phase half bridge circuit 19V, and a W-phase half bridge circuit 19W. The half bridge circuits 19U to 19W of each phase individually have upper arm switching elements 18A to 18C and lower arm switching elements 18D to 18F, respectively. Further, flywheel diodes 31 are respectively connected in antiparallel to the switching elements 18A to 18F.

Incidentally, in the embodiment, each of the switching elements 18A to 18F is comprised of an insulated gate bipolar transistor (IGBT) or the like in which a MOS structure is incorporated in a gate portion.

Then, the collectors of the upper arm switching elements 18A to 18C of the inverter circuit 28 are connected to an upper arm power supply line (positive electrode side bus line) 10 of the DC power supply 29 and a smoothing capacitor 32. On the other hand, the emitters of the lower arm switching elements 18D to 18F of the inverter circuit 28 are connected to a lower arm power supply line (negative electrode side bus line) 15 of the DC power supply 29 and the smoothing capacitor 32. A DC link voltage $V_{dc}$ smoothed by the smoothing capacitor 32 is configured to be applied to the inverter circuit 28.

In this case, the upper arm switching element 18A and the lower arm switching element 18D of the U-phase half bridge circuit 19U are connected in series. A collector terminal of the lower arm switching element 18D is connected to an emitter terminal of the upper arm switching element 18A. Also, the upper arm switching element 18B and the lower arm switching element 18E of the V-phase half bridge circuit 19V are connected in series. An emitter terminal of the upper arm switching element 18B and a collector terminal of the lower arm switching element 18E are connected. Further, the upper arm switching element 18C and the lower arm switching element 18F of the W-phase half bridge circuit 19W are connected in series. An emitter terminal of the upper arm switching element 18C and a collector terminal of the lower arm switching element 18F are connected.

Then, a connection point between the upper arm switching element 18A and the lower arm switching element 18D of the U-phase half bridge circuit 19U is connected to a U-phase armature coil 2 of the motor 8. A connection point between the upper arm switching element 18B and the lower arm switching element 18E of the V-phase half bridge circuit 19V is connected to a V-phase armature coil 3 of the motor 8. A connection point between the upper arm switching element 18C and the lower arm switching element 18F of the W-phase half bridge circuit 19W is connected to a W-phase armature coil 4 of the motor 8.

(2) Configuration of Control Device 21

The control device 21 is constituted of a microcomputer having a processor. In the embodiment, the control device 21 inputs a rotational number command value from a vehicle ECU, and inputs a phase current (motor current) from the motor 8 to thereby control an ON/OFF state (switching operation) of each of the upper and lower arm switching elements 18A to 18F of the inverter circuit 28 based on these. Specifically, the control device 21 controls a gate voltage applied to each of gate terminals of the upper and lower arm switching elements 18A to 18F.

The control device 21 of the embodiment has a phase voltage command operation unit 33, a PWM 4 signal generation unit 36, a gate driver 37, and current sensors 26A and 26B each constituted of a current transformer for measuring each of a U-phase current $i_u$, a V-phase current $i_v$, and a W-phase current $i_w$, which are phase currents of each phase flowing through the motor 8. Each of the current sensors 26A and 26B is connected to the phase voltage command operation unit 33.

(2-1) Phase Voltage Command Operation Unit 33

Figure 2:
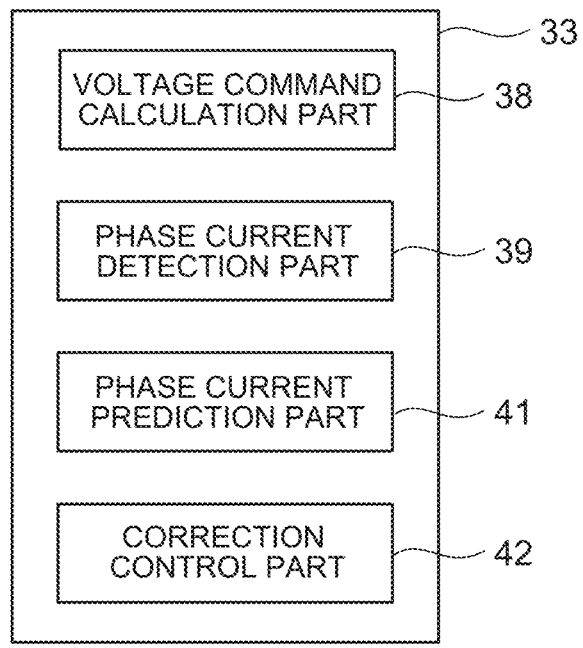
FIG. 2 is a block diagram showing functions of a phase voltage command calculation unit in FIG. 1.

FIG. 2 shows the configuration of the phase voltage command operation unit 33 of the above control device 21. The phase voltage command operation unit 33 includes a voltage command calculation part 38, a phase current detection part 39, a phase current prediction part 41, and a correction control part 42 as functions configured by a program.

(2-1-1) Voltage Command Calculation Part 38

The above voltage command calculation part 38 calculates V-phase and W-phase voltage command values $C_v$ and $C_w$ using the following formulas (II) and (III). Incidentally, since a U-phase voltage command value $C_u$ is output by inverting PWM, a switching pattern is calculated in which each of the V-phase and W-phase voltage command values $C_v$ and $C_w$ is inverted. These $C_u$, $C_v$, and $C_w$ are three-phase modulation voltage command values for generating a L-phase voltage $V_u$, a V-phase voltage $V_v$, and a W-phase voltage $V_w$ applied to the armature coils 2 to 4 of each phase of the motor 8. Incidentally, the voltage command calculation part 38 updates the voltage command values $C_u$, $C_v$, and $C_w$ of each phase in a carrier cycle (trough).

[Math. 2]
$$C_v = \left(\frac{2V_m}{V_{dc}}\cos\left(\theta_{re} - \frac{2}{3}\pi + \theta_m\right) + \frac{1}{3}\right)C_A \quad (II)$$

[Math. 3]
$$C_w = \left(\frac{2V_m}{V_{dc}}\cos\left(\theta_{re} + \frac{2}{3}\pi + \theta_m\right) + \frac{1}{3}\right)C_A \quad (III)$$

where the voltage command values $C_u$, $C_v$, and $C_w$ of each phase are values normalized by a carrier count. Also, $V_{dc}$ is the DC link voltage described above, and $V_m$ is the magnitude of the voltage vector command value and is obtained by the following formula (IV). In addition, $\theta_m$ is the phase of the voltage vector command value and is obtained by the following formula (V). Further, $\theta_{re}$ is a motor electrical angle, CA is the peak value of the carrier count (triangular wave carrier), $V_d^{ref}$ is a d-axis voltage command value, and $V_q^{ref}$ is a q-axis voltage command value.

[Math. 4]
$$V_m = \sqrt{V_q^{ref^2} + V_d^{ref^2}} \quad (IV)$$

[Math. 5]
$$\theta_m = \tan^{-1}\frac{V_q^{ref}}{V_d^{ref}} \quad (V)$$

(2-1-2) Phase Current Detection Part 39

The phase current detection part 39 samples the U-phase current $i_u$ by the above-described current sensor 26A and samples the V-phase current $i_v$ by the above-described current sensor 26B. Then, the V-phase current $i_w$ is obtained by calculation from these. In this case, the phase current detection part 39 samples the phase current at peak and trough timings of the triangular wave carrier.

Incidentally, as a method of detecting the phase current of each phase, in addition to its measurement with the current sensors 26A and 26B as in the embodiment, there is known, for example, a so-called one-shunt current detection method of detecting a current value of the lower arm power supply line 15 by using a single shunt resistor and estimating the current from the current value and an operating state of the motor 8, or the like. Therefore, the method of detecting and estimating each phase current is not particularly limited.

(2-1-3) Phase Current Prediction Part 41

When the phase current prediction part 41 compares the voltage command values $C_u$, $C_v$, and $C_w$ of the U phase, V phase, and W phase calculated by the above-described voltage command calculation part 38 with the triangular wave carrier to perform switching, the phase current predication part 41 predicts the phase current at the switching timing when the upper arm switching elements 18A to 18C of each phase or the lower arm switching elements 18D to 18F of each phase in an ON state are turned OFF. Predictive control of the phase current by the phase current prediction part 41 will be described in detail later.

(2-1-4) Correction Control Part 42

Based on the phase current of each phase at the switching timing predicted by the phase current prediction part 41, the correction control part 42 corrects each of the voltage command values $C_u$, $C_v$, and $C_w$ of each phase calculated by the voltage command calculation part 38 so as to assume such a switching operation as to cancel a change in each of the phase voltages $V_u$, $V_v$, and $V_w$ applied to the motor 8 with another change in the phase voltage. Correction control by the correction control part 42 will also be described in detail later.

(2-2) PWM Signal Generation Unit 36

The PWM signal generation unit 36 inputs the voltage command values $C_u$, $C_v$, and $C_w$ of each phase corrected by the correction control part 42 of the phase voltage command operation unit 33 and compares in magnitude between these voltage command values $C_u$, $C_v$, and $C_w$ and the triangular wave carrier to thereby generate and output a PWM signal to be a drive command signal of each of the U-phase half bridge circuit 19U, the V-phase half bridge circuit 19V, and the W-phase half bridge circuit 19W of the inverter circuit 28.

Incidentally, in the embodiment, the functions of the phase current prediction part 41 and the correction control part 42 are provided in the phase voltage command operation unit 33, but are not limited thereto. The PWM signal generation unit 36 may be provided with them to thereby correct the voltage command values $C_u$, $C_v$, and $C_w$ of each phase output by the phase voltage command operation unit 33 and compare each value after correction and the triangular wave carrier.

(2-3) Gate Driver 37

The gate driver 37 generates based on the PWM signal output from the PWM signal generation unit 36, a gate voltage for each of the upper arm switching element 18A and the lower arm switching element 18D of the U-phase half bridge circuit 19U, a gate voltage for each of the upper arm switching element 18B and the lower arm switching element 18E of the V-phase half bridge circuit 19V, and a gate voltage for each of the upper arm switching element 18C and the lower arm switching element 18F of the W-phase half bridge circuit 19W.

Then, each of the upper and lower arm switching elements 18A to 18F of the inverter circuit 28 is ON/OFF driven based on the gate voltage output from the gate driver 37. That is, when the gate voltage is brought to an ON state (predetermined voltage value), the switching element is ON operated. When the gate voltage is brought to an OFF state (zero), the switching element is OFF operated. When the upper and lower arm switching elements 18A to 18F are the above-mentioned IGBTs, the gate driver 37 is a circuit for applying the gate voltage to the IGBT based on the PWM signal, and is constituted of a photocoupler, a logic IC, a transistor, and the like.

Then, the voltage at the connection point between the upper arm switching element 18A and the lower arm switching element 18D of the U-phase half bridge circuit 19U is applied (output) to the U-phase armature coil 2 of the motor 8 as the U-phase voltage $V_u$ (phase voltage). The voltage at the connection point between the upper arm switching element 18B and the lower arm switching element 18E of the V-phase half bridge circuit 19V is applied (output) to the V-phase armature coil 3 of the motor 8 as the V-phase voltage $V_v$ (phase voltage). The voltage at the connection point between the upper arm switching element 18C and the lower arm switching element 18F of the W-phase half bridge circuit 19W is applied (output) to the W-phase armature coil 4 of the motor 8 as the W-phase voltage $V_w$ (phase voltage).

(3) Operation of Control Device 21

Figure 3:
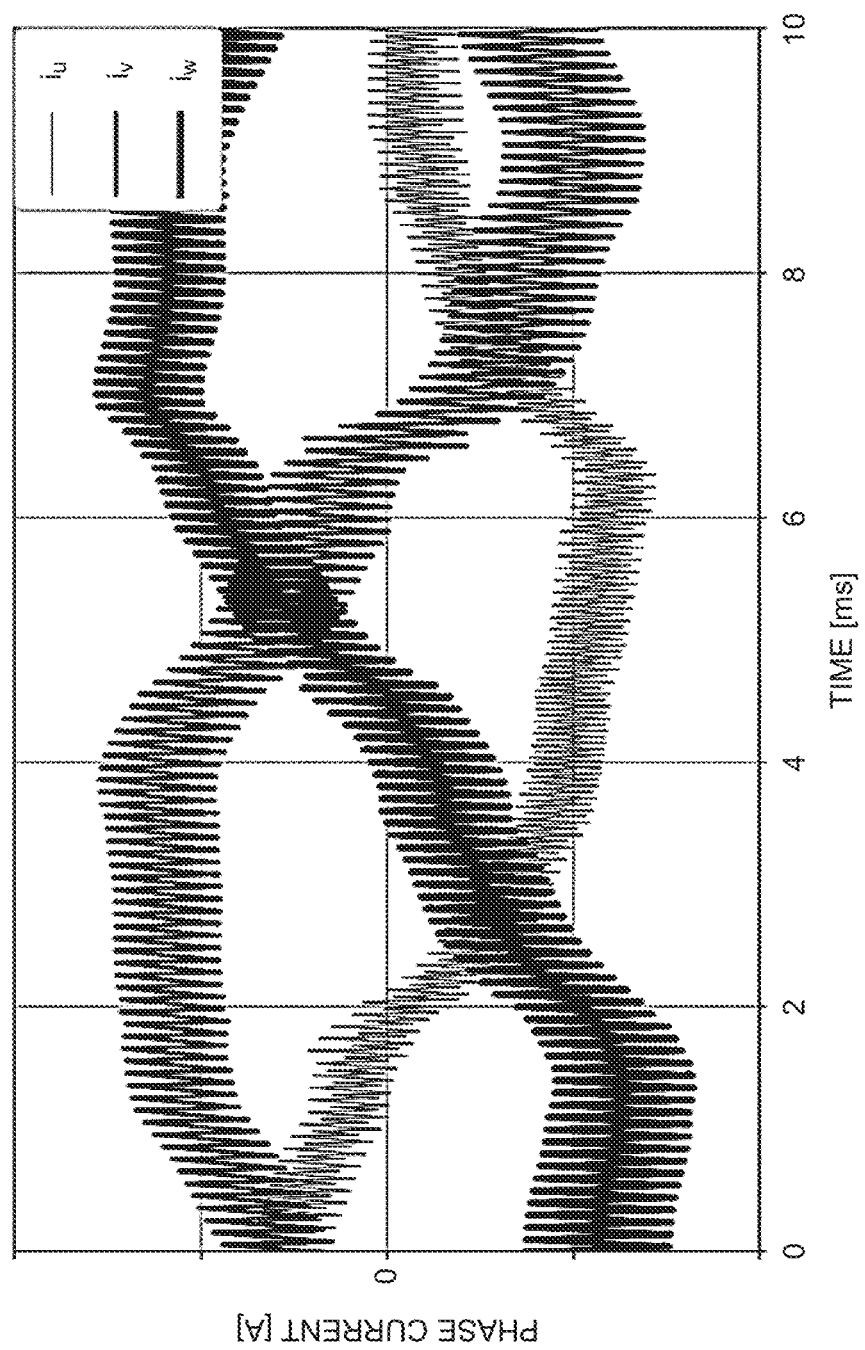
FIG. 3 is a diagram showing phase currents ($i_u$, $i_v$, and $i_w$) flowing in a motor in FIG. 1.

Next, description will be made about an actual control operation of the control device 21 with reference to FIGS. 3 to 11. First, FIG. 3 shows the phase currents $i_u$, $i_v$, and $i_w$ which flow through the U-phase, V-phase and W-phase armature coils 2, 3, and 4 of the motor 8. As is clear from this figure, each of the phase currents $i_u$, $i_v$, and $i_w$ contains ripples (oscillations). In particular, it can be seen that when focusing on the phase current (for example, the U-phase current $i_u$ in the vicinity of 2 ms) near zero A (amperes), the U-phase current $i_u$ keeps floating above and below zero A (amperes) and changes in polarity minutely.

(3-1) Conventional General Three-Phase Modulation Method

Figure 4:
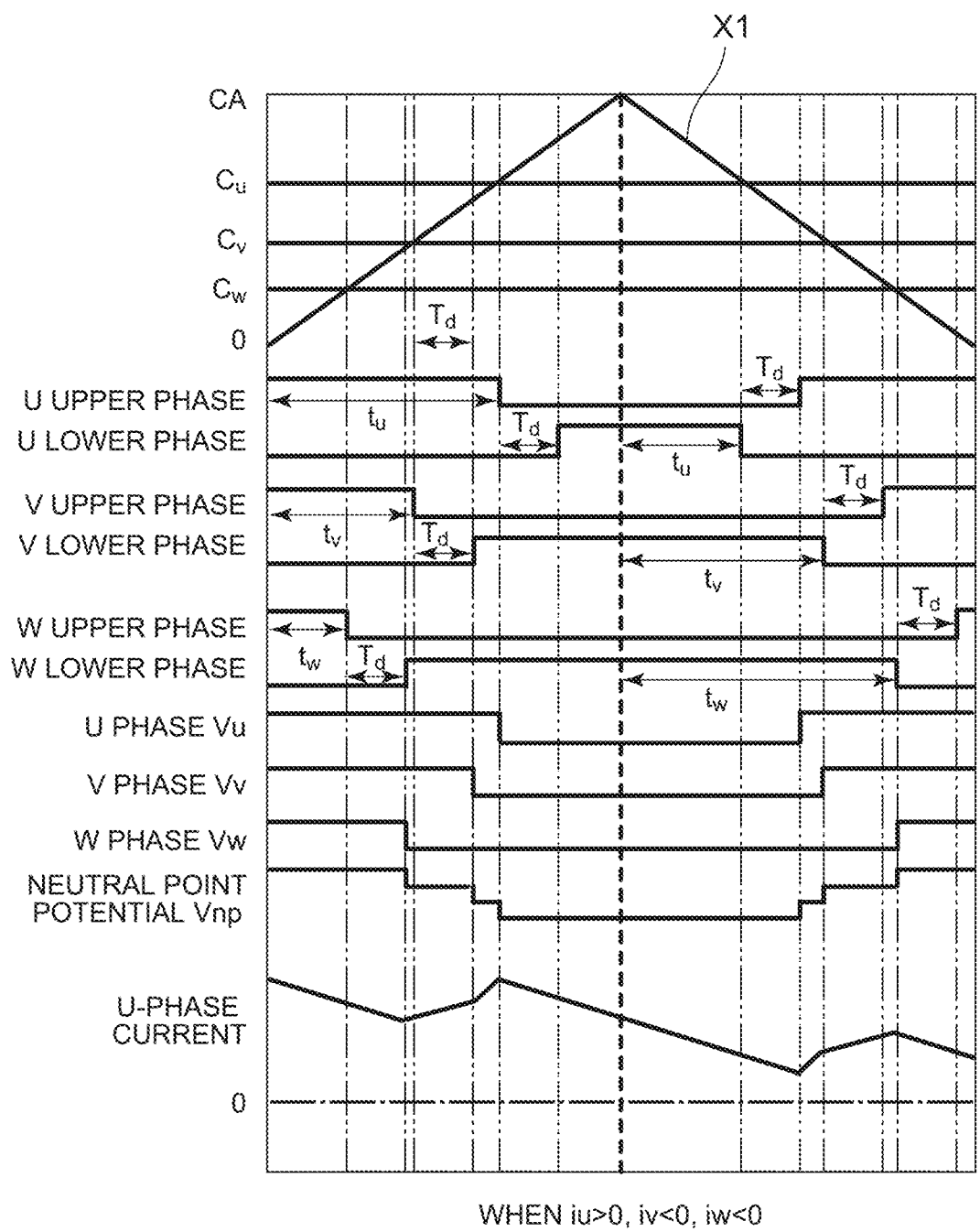
FIG. 4 is a diagram showing voltage command values, a carrier triangular wave, PWM waveforms, phase voltages, a neutral point potential of the motor, and a U-phase current in a conventional general three-phase modulation method.

Next, FIG. 4 shows a conventional general three-phase modulation method. In this figure, when viewed from the top stage, X1 indicates the triangular wave carrier described above, $C_u$, $C_v$, and $C_u$ indicate voltage command values of U, V, and W phases normalized by a carrier count, a U upper phase indicates an ON/OFF state of the upper arm switching element 18A of the U phase, a U lower phase indicates an ON/OFF state of the lower arm switching element 18D of the U phase, a V upper phase indicates an ON/OFF state of the upper arm switching element 18B of the V phase, a V lower phase indicates an ON/OFF state of the lower arm switching element 18E of the V phase, a W upper phase indicates an ON/OFF state of the upper arm switching element 18C of the W phase, and a W lower phase indicates an ON/OFF state of the lower arm switching element 18F of the W phase (PAW waveforms in any case). A U phase $V_u$ indicates a U-phase voltage $V_u$, a V phase $V_v$ indicates a V-phase voltage $V_v$, $V_w$ indicates a W-phase voltage $V_w$, $V_{np}$ indicates a neutral point potential of the motor 8, and the bottom stage indicates a U-phase current $i_u$.

Incidentally, in FIG. 4, the polarity of the U-phase current $i_u$, is assumed to be positive (direction thereof flowing into the motor 8: $i_u$>0), and the polarities of the V-phase current and the W-phase current $i_w$ are assumed to be negative (directions thereof flowing out from the motor 8: $i_v$<0 and $i_w$<0).

In this figure, the upper arm switching element 18A is turned ON in a section in which the voltage command value $C_u$ is smaller than the triangular wave carrier X1, and the lower arm switching element 18D is turned ON in a section in which the voltage command value $C_u$ is larger than the triangular wave carrier X1. Also, the upper arm switching element 18B is turned ON in a section in which the voltage command value $C_v$ is larger than the triangular wave carrier X1, and the lower arm switching element 18E is turned ON in a section in which the voltage command value $C_v$ is smaller than the triangular wave carrier X1. Further, the upper arm switching element 18C is turned ON in a section in which the voltage command value $C_w$ is larger than the triangular wave carrier X1, and the lower arm switching element 18F is turned ON in a section in which the voltage command value $C_w$ is smaller than the triangular wave carrier X1. However, there is provided a dead time $T_d$ for preventing the upper and lower arm switching elements 18A and 18D, 18B and 18E, and 18C and 18F of each phase from being turned ON simultaneously. After the dead time $T_d$, has elapsed since the switching element being ON is turned OFF, the switching element being OFF is turned ON.

Further, $t_u$, $t_v$, and $t_w$ are ON times of the U-phase, V-phase, and W-phase upper arm switching elements 18A to 18C and lower arm switching elements 18D to 18F. The sampling timing of the phase current is the timing between the peak (timing at which the peak value CA is provided) and the trough (timing at which the triangular wave carrier X1 becomes 0) of the triangular wave carrier X1 in the same manner as above. Therefore, in the case of FIG. 4, each of the ON times $t_u$, $t_v$, and $t_w$ of the upper arm switching elements 18A to 18C becomes an ON time from the timing when the triangular wave carrier X1 becomes 0, and each of the ON times $t_u$, $t_v$, and $t_w$ of the lower arm switching elements 18D to 18F becomes an ON time from the timing when the triangular wave carrier X1 reaches the peak value CA.

When the upper and lower arm switching elements 18A to 18F of each phase are switched as shown in FIG. 4, the phase voltages $V_u$, $V_v$, and $V_w$ change as shown in FIG. 4 respectively, so that the neutral point potential $V_{np}$ of the motor 8 corresponding to the sum $(V_u+V_v+V_w)$ of the phase voltages fluctuates greatly. Therefore, a large amount of common mode noise is generated.

Figure 5:
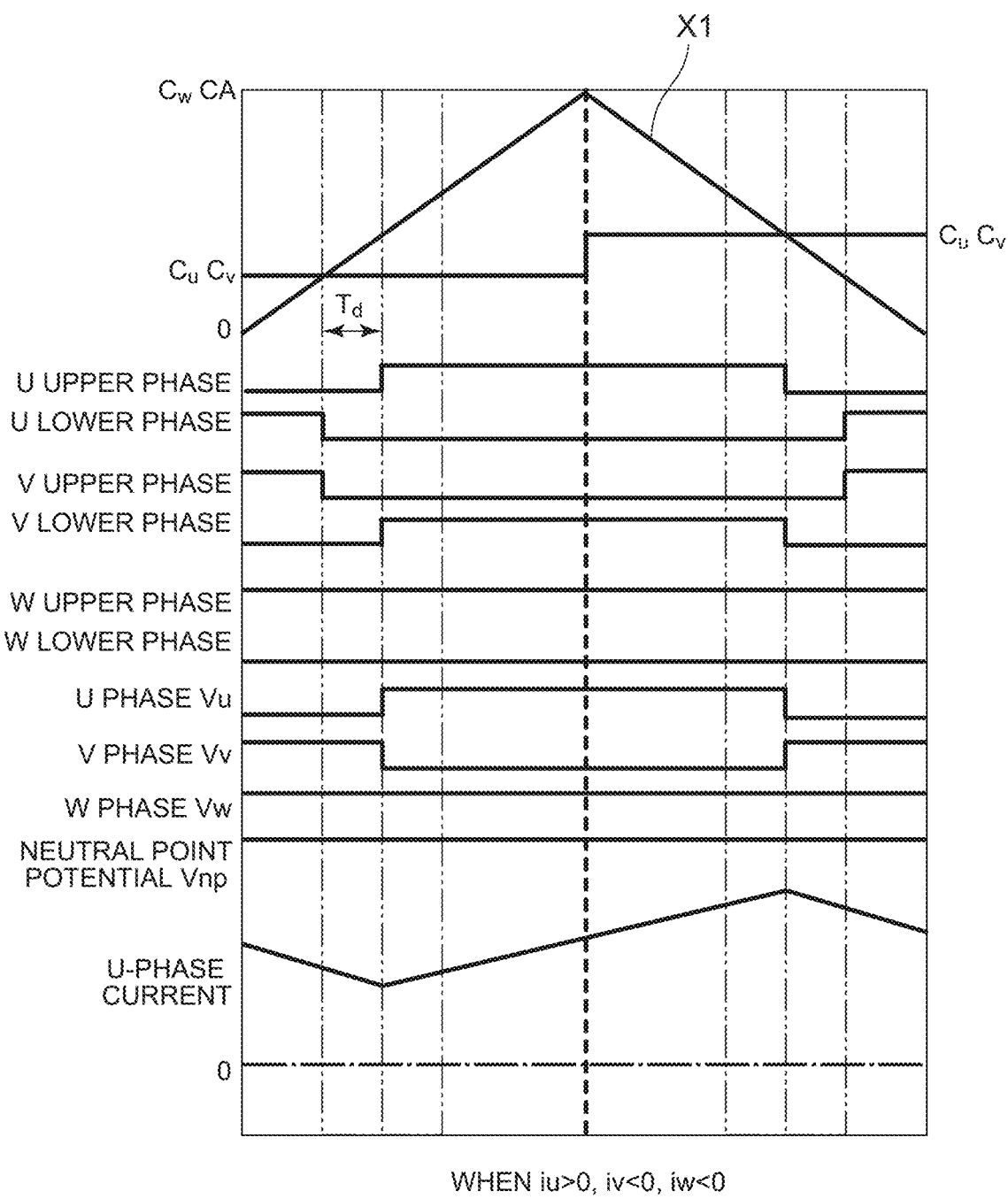
FIG. 5 is a diagram showing voltage command values, a carrier triangular wave, PWM waveforms, phase voltages, a neutral point potential of the motor, and a U-phase current for describing conventional control of canceling out a change in the phase voltage with another change in the phase voltage.

(3-2) Conventional Correction Control for Suppressing Fluctuation in Neutral Point Potential $V_{np}$ (3-2-1) when Fluctuation in Neutral Point Potential $V_{np}$ can be Suppressed Therefore, the control (conventional control) shown in FIG. 5 has been proposed as control for suppressing the above fluctuation in the neutral point potential $V_{np}$. In this control, the voltage command value is corrected so that the change in the phase voltage is canceled by another change in the phase voltage. Incidentally, in this case as well, the polarity of the U-phase current $I_u$ is positive (direction thereof flowing into the motor 8: $i_u$>0), and the polarities of the V-phase current $i_v$ and the W-phase current $i_w$ are negative (direction thereof flowing out from the motor 8: $i_v$<0 and $i_w$<0). Further, the U-phase current $i_u$ is assumed to be sufficiently larger than zero A (amperes).

In this example, the W-phase voltage command value $C_w$ is the peak value CA of the carrier triangular wave X1 in the entire interval of one carrier cycle, and the U-phase voltage command value $C_u$ and the V-phase voltage command value $C_v$ are made the same value (as described above, the U-phase voltage command value $C_u$ becomes a switching pattern obtained by inverting each voltage command value $C_v$ of the V phase).

By correcting the voltage command values $C_u$, $C_v$, and $C_w$ of each phase in FIG. 4 to the voltage command values $C_u$, $C_v$, and $C_w$ as shown in FIG. 5, the W-phase voltage $V_w$ does not change while the W-phase upper arm switching element 18C remains ON within one carrier cycle and the W-phase lower arm switching element 18F remains OFF Further, the timing at which the U-phase upper arm switching element 18A is turned ON is synchronized with the timing at which the V-phase lower arm switching element 18E is turned ON, and the timing at which the U-phase upper arm switching element 18A is turned OFF is synchronized with the timing at which the V-phase lower arm switching element 18E is turned OFF. Therefore, the timing at which the V-phase voltage $V_v$ falls and the timing at which the U-phase voltage $V_u$ rises, and the timing at which the V-phase voltage $V_v$ rises and the timing at which the U-phase voltage $V_v$ falls are respectively synchronized with each other, and the change in the V-phase $V_v$ is canceled out by the change in the U-phase voltage $V_u$, so that the neutral point potential $V_{np}$ of the motor 8 does not fluctuate as shown in FIG. 5. This suppresses the generation of common mode noise.

(3-2-2) when Fluctuation in Neutral Point Potential $V_{np}$ Cannot be Suppressed However, when the U-phase current $i_u$ is almost zero A (amperes) as in the vicinity of 2 ms in FIG. 3 mentioned above, the U-phase current $i_u$ keeps floating above and below zero A (ripple) and changes in polarity minutely. Therefore, the sampled U-phase current $i_u$ and the U-phase current $i_u$ at the timing when the U-phase lower arm switching element 18D is actually switched may differ in polarity.

Figure 6:
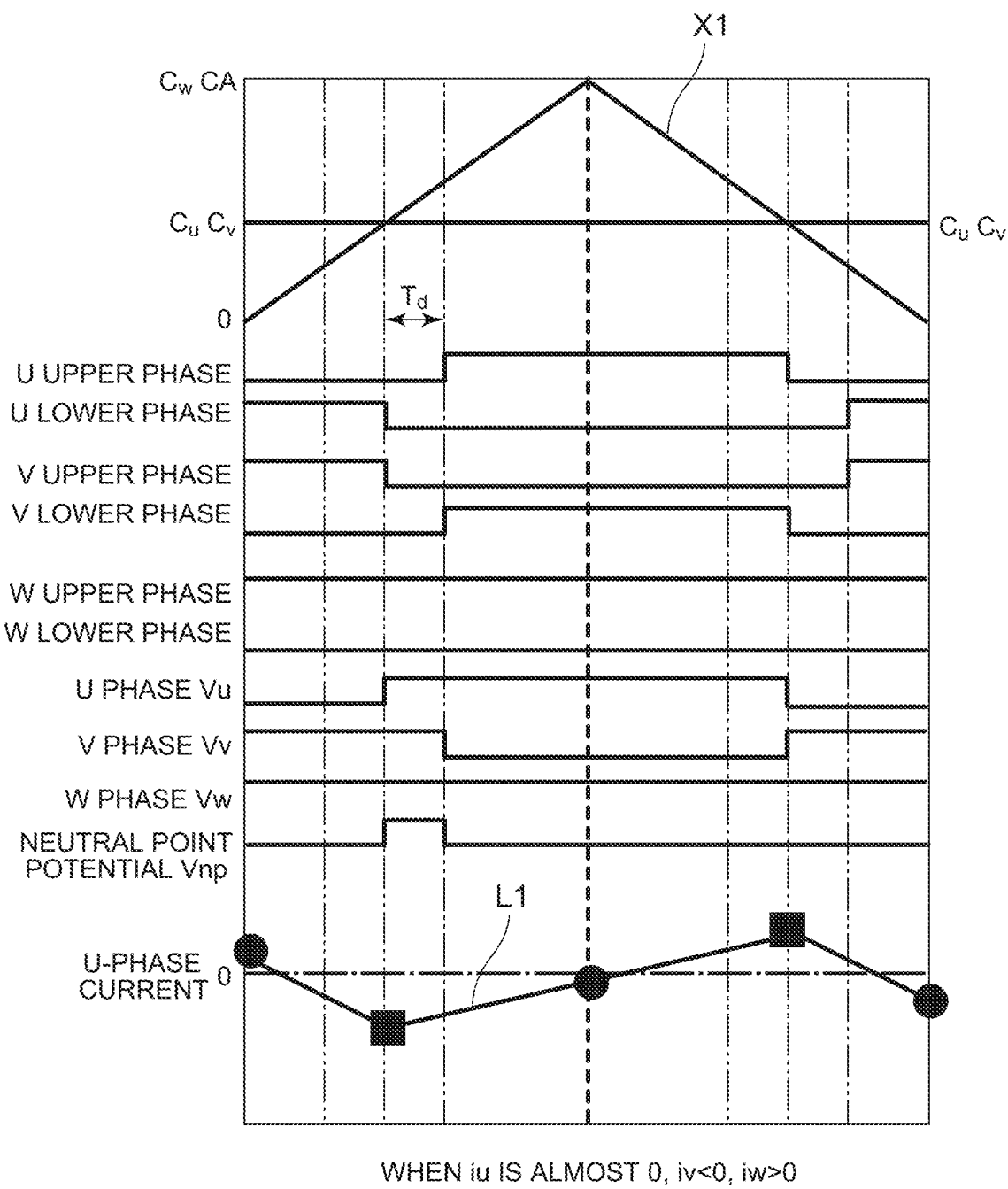
FIG. 6 is a diagram showing voltage command values, a carrier triangular wave, PWM waveforms, phase voltages, a neutral point potential of the motor, and a U-phase current when the U phase current has different polarities at a sampling timing and a switching timing.

Such a case is shown in FIG. 6. Incidentally, in this figure, the polarity of the V-phase current $i_v$ is assumed to be negative (direction thereof flowing out of the motor 8: $i_v$<0), and the polarity of the W-phase current $i_w$ is assumed to be positive (direction thereof flowing into the motor 8: $i_w$>0). Also, black circles in the figure indicate the sampling timings of the phase currents $i_u$, $i_v$, and $i_w$ (peak and trough timings of the triangular wave carrier X1), and black squares indicate switching timings of the U-phase lower arm switching element 18D and the V-phase upper arm switching element 18B (first half), and the U-phase upper arm switching element 18A and the V-phase lower arm switching element 18E (second half) (switching timings at which the U-phase lower arm switching element 18D and the V-phase upper arm switching element 18B (first half), and the U-phase upper arm switching element 18A and the V-phase lower arm switching element 18E (second half), which are brought to the ON state by the voltage command values $C_u$, $C_v$, and $C_w$ of each phase before correction, are turned OFF). Further, a solid line L1 in FIG. 6 indicates a change in the U-phase current $i_u$ actually flowing through the motor 8.

Figure 7:
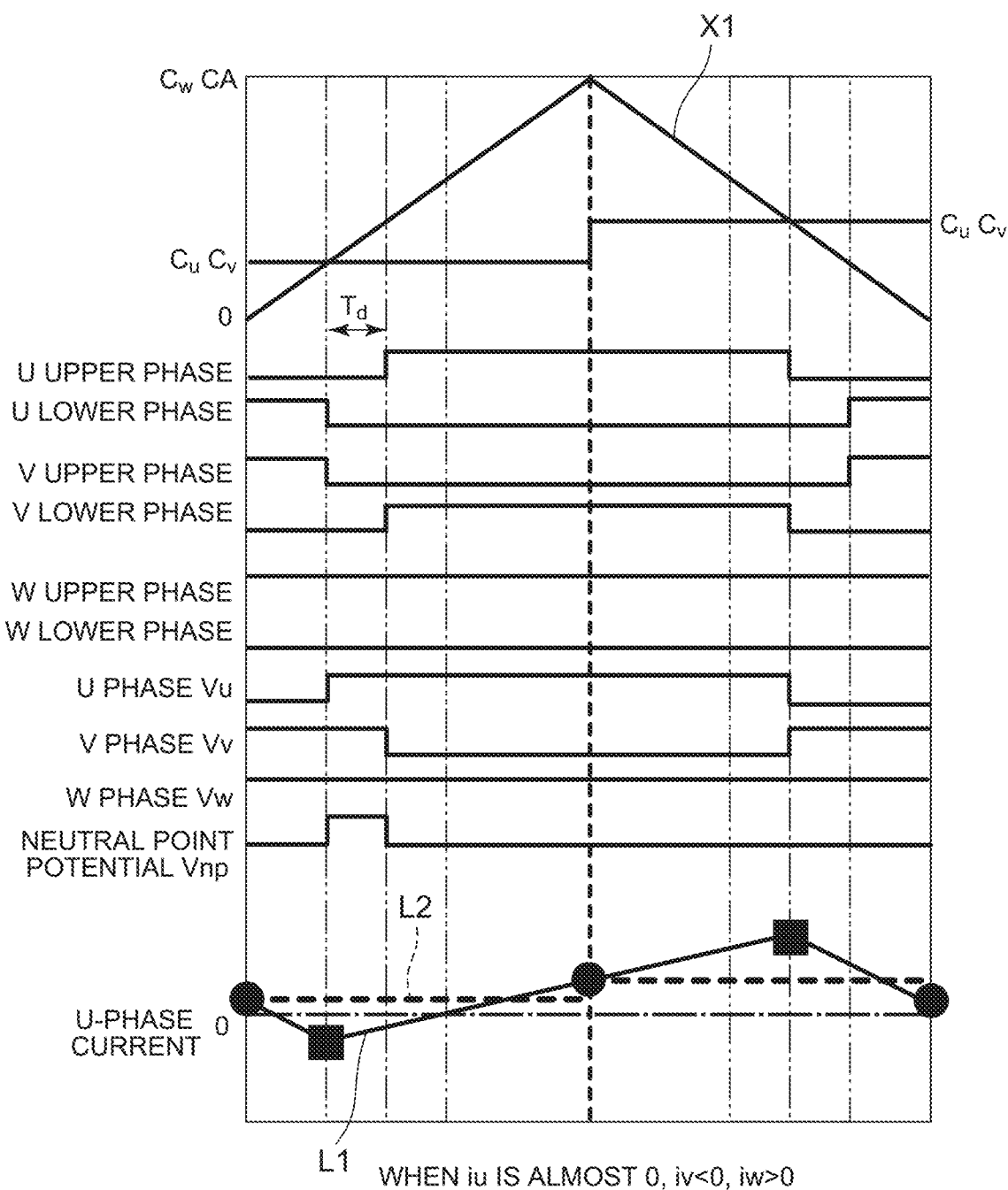
FIG. 7 is a diagram showing voltage command values, a carrier triangular wave, PWM waveforms, phase voltages, a neutral point potential of the motor, and a U-phase current for describing conventional control of canceling out a change in the phase voltage in the case of FIG. 6 with another change in the phase voltage.

Since the voltage command values $C_u$, $C_v$, and $C_w$ are not corrected in FIG. 6, the neutral point potential $V_{np}$ of the motor 8 fluctuates in the first half of the carrier cycle. Thus, since the polarity of the U-phase current $i_u$ is positive (direction thereof flowing into the motor 8; $i_u$>0) at the sampling timing (black circle), there is shown in FIG. 7, a case where the voltage command values $C_u$, $C_v$, and $C_w$ of each phase are corrected in a manner similar to the case of FIG. 5. Incidentally, since the polarity of the sampled U-phase current $i_u$ is positive (direction thereof flowing into the motor 8: $i_u$>0) in FIG. 7, similarly to the case of FIG. 5, the U-phase voltage command value $C_u$ and V-phase voltage command value $C_v$ in FIG. 6 are corrected downward in the first half of the carrier cycle in order to synchronize the timing at which the U-phase upper arm switching element 18A is turned ON and the timing at which the V-phase lower arm switching element 18E are turned ON. Incidentally, a thick broken line L2 in FIG. 7 indicates the value of the sampled U-phase current $i_u$.

In the case of FIG. 7, the polarity of the U-phase current $i_u$ was positive (direction thereof flowing into the motor 8: $i_u$>0) at the sampling timing (black circle), but at the actual switching timing (black square on the left side of FIG. 6), the polarity of the U-phase current $i_u$ has changed to be negative (direction thereof flowing out from the motor 8: $i_u$<0), so that the polarity of the U-phase current $i_u$ is erroneously determined. If the U-phase and V-phase voltage command values $C_u$ and $C_v$ are corrected in a manner similar to the case of FIG. 5, the U-phase voltage $V_u$ actually rises at the timing when the lower arm switching element 18D is turned OFF.

On the other hand, since the polarity of the V-phase current $i_v$ is negative (direction thereof flowing out of the motor 8: $i_v$<0), and the V-phase voltage $V_v$ falls at the timing when the lower arm switching element 18E is turned ON, the timing at which the U-phase voltage $V_u$ rises as shown in FIG. 7 becomes earlier than the timing at which the V-phase voltage $V_v$ falls, by the dead time Id as compared with the case of FIG. 5, and hence, the neutral point potential $V_{np}$ fluctuates in the rising direction in a pulse shape in this wide (the width of the dead time $T_d$). This makes it impossible to suppress the generation of common mode noise (refer to the first half of the carrier cycle in FIG. 7).

(3-3) Correction Control of the Present Invention to Suppress Fluctuation in Neutral Point Potential $V_{np}$ Thus, in the present invention, the above-described phase current prediction part 41 predicts the phase current of each phase at the switching timing, and the correction control part 42 corrects each of the voltage command values $C_u$, $C_v$, and $C_w$ of each phase calculated by the voltage command calculation part 38, based on the predicted phase current. Hereinafter, description will be made about the correction control of the present invention with reference to FIG. 8.

(3-3-1) Prediction of Phase Current at Switching Timing (Phase Current Prediction Part 41)

First, description will be made about predictive control of the phase current at the switching timing by the phase current prediction part 41. The phase current prediction part 41 predicts the phase current $i_{uvw}$ (t+$t_{uvw}$) of each phase at the switching timing using the following formula (I).

[Math. 6]

$$i_{uvw}(t + t_{uvw}) = i_{uvw}(t) + \frac{1}{L_{uvw}}\left\{\frac{\text{sgn}(V_{uvw})V_{dc}}{2} - (e_{uvw} + v_{np})\right\}t_{uvw} \quad (I)$$

where $i_{uvw}$ (t+$t_{uvw}$) indicates the phase currents of the U, V, and W phases at the switching timing when the upper arm switching elements 18A to 18C or the lower arm switching elements 18D to 18F brought to the ON state by the voltage command values $C_u$, $C_v$, and $C_w$, (voltage command values before correction) of each phase calculated by the voltage command calculation part 38 are turned OFF, $t_{uvw}$ indicates the ON times of the upper arm switching elements 18A to 18C or lower arm switching elements 18D to 18F of the U, V, and W phases, $i_{uvw}$ (t) indicates the phase currents of the U, V, and W phases sampled by the phase current detection part 39 at the sampling timing, $L_{uvw}$ indicates the inductances of the U, V, and W phases of the motor 8, $V_{dc}$ indicates the DC link voltage described above, $e_{uvw}$ indicates the back electromotive forces of the U phase, V phase, and W phase of the motor 8, $V_{np}$ indicates the neutral point potential described above, and sgn ($V_{uvw}$) indicates the sign functions of the phase voltages $V_u$, $V_v$ and $V_w$. When the phase voltages $V_u$, $V_v$, and $V_w$ are $V_{dc}$, sgn ($V_{uvw}$) becomes 1, and when the phase voltages $V_u$, $V_v$, and $V_w$ are 0, sgn ($V_{uvw}$) becomes −1.

Incidentally, since the above formula (I) shows each phase of the U phase, the V phase, and the W phase together, the formulas separated for each phase are shown by the following formulas (VI) to (XI) for ease of understanding.

[Math. 7]

$$i_u(t+t_u) = i_u(t) + \frac{1}{L_u}\left\{\frac{\text{sgn}(V_u)V_{dc}}{2} - (e_u + v_{np})\right\}t_u \quad \text{(VI)}$$

[Math. 8]

$$\text{sgn}(V_u) = \begin{cases} 1 & : V_{dc} \\ -1 & : 0 \end{cases} \quad \text{(VII)}$$

$i_u$ (t+$t_u$) in the above formulas (VI) and (VII) indicates the phase current of the U phase at the switching timing when the upper arm switching element 18A or the lower arm switching element 18D brought to the ON state by the 1-phase voltage command value $C_u$ (voltage command value before correction) calculated by the voltage command calculation part 38 is turned OFF, $t_u$ indicates the ON time of the U-phase upper arm switching element 18A or lower arm switching element 18D, $i_u$ (t) indicates the phase current of the U phase sampled by the phase current detection part 39 at the sampling timing, $L_u$ indicates the inductance of the U phase of the motor 8, $e_u$ indicates the back electromotive force of the U phase of the motor 8, and sgn ($V_u$) indicates the sign function of the U-phase voltage $V_u$. When the U-phase voltage $V_u$ is $V_{dc}$, sgn ($V_u$) becomes 1, and when the U-phase voltage $V_u$ is 0, sgn ($V_u$) becomes −1.

[Math. 9]

$$i_v(t+t_v) = i_v(t) + \frac{1}{L_v}\left\{\frac{\text{sgn}(V_v)V_{dc}}{2} - (e_v + v_{np})\right\}t_v \quad \text{(VIII)}$$

[Math. 10]

$$\text{sgn}(V_v) = \begin{cases} 1 & : V_{dc} \\ -1 & : 0 \end{cases} \quad \text{(IX)}$$

$i_v$ (t+$t_v$) in the above formulas (VIII) and (IX) indicates the phase current of the V phase at the switching timing when the upper arm switching element 18B or the lower arm switching element 18E brought to the ON state by the V-phase voltage command value $C_v$ (voltage command value before correction) calculated by the voltage command calculation part 38 is turned OFF, $t_v$ indicates the ON time of the V-phase upper arm switching element 18B or lower arm switching element 18E, $i_v$ (t) indicates the phase current of the V phase sampled by the phase current detection part 39 at the sampling timing, $L_v$ indicates the inductance of the V phase of the motor 8, $e_v$ indicates the back electromotive force of the V phase of the motor 8, and sgn ($V_v$) indicates the sign function of the V-phase voltage $V_v$. When the V-phase voltage $V_v$ is $V_{dc}$, sgn ($V_v$) becomes 1, and when the V-phase voltage $V_v$ is 0, sgn ($V_v$) becomes −1.

[Math. 11]

$$i_w(t+t_w) = i_v(t) + \frac{1}{L_w}\left\{\frac{\text{sgn}(V_w)V_{dc}}{2} - (e_w + v_{np})\right\}t_w \quad \text{(X)}$$

[Math. 12]

$$\text{sgn}(V_w) = \begin{cases} 1 & : V_{dc} \\ -1 & : 0 \end{cases} \quad \text{(XI)}$$

$i_w$ (t+$t_w$) in the above formulas (X) and (XI) indicates the phase current of the W phase at the switching timing when the upper arm switching element 18C or the lower arm switching element 18F brought to the ON state by the W-phase voltage command value $C_w$ (voltage command value before correction) calculated by the voltage command calculation part 38 is turned OFF, $t_w$ indicates the ON time of the W-phase upper arm switching element 18C or lower arm switching element 18F, $i_w$ (t) indicates the phase current of the W phase sampled by the phase current detection part 39 at the sampling timing (actually calculated by calculation as described above), $L_w$ indicates the inductance of the W phase of the motor 8, $e_w$ indicates the back electromotive force of the W phase of the motor 8, and sgn ($V_w$) indicates the sign function of the W-phase voltage $V_w$. When the W-phase voltage $V_w$ is $V_{dc}$, sgn ($V_w$) becomes 1, and when the W-phase voltage $V_w$ is 0, sgn ($V_w$) becomes −1.

The voltage applied to the U-phase armature coil 2 of the motor 8 is shown in the braces of the above formula (VI). The value obtained by multiplying it by 1/$L_u$ means the slope of the U-phase current $i_u$ [A/s]. Therefore, since the second term on the right side of the formula (VI) indicates the amount of increase or decrease in the U-phase current $i_u$, the phase current prediction part 41 adds the amount of increase or decrease in the U-phase current $i_u$ from the sampling timing to the switching timing to the U-phase current $i_u$ (t) sampled by the phase current detection part 39 to predict the U-phase current $i_u$ (t+$t_u$) at the switching timing.

Similarly, the voltage applied to the V-phase armature coil 3 of the motor 8 is shown in the braces of the formula (VIII). The value obtained by multiplying it by 1/$L_v$ means the slope of the V-phase current $i_v$ [A/s]. Therefore, since the second term on the right side of the formula (Viii) indicates the amount of increase or decrease in the V-phase current $i_v$, the phase current prediction part 41 adds the amount of increase or decrease in the V-phase current $i_v$ from the sampling timing to the switching timing to the V-phase current $i_v$ (t) sampled by the phase current detection part 39 to predict the V-phase current $i_v$ (t+$t_v$) at the switching timing.

The voltage applied to the W-phase armature coil 4 of the motor 8 is also shown in the braces of the formula (X). The value obtained by multiplying it by 1/$L_w$ means the slope of the W-phase current $i_w$ [A/s]. Therefore, since the second term on the right side of the formula (X) indicates the amount of increase or decrease in the W-phase current $i_w$, the phase current prediction part 41 adds the amount of increase or decrease in the V-phase current $i_w$ from the sampling timing to the switching timing to the W-phase current $i_w$ (t) sampled (actually calculated) by the phase current detection part 39 to predict the W-phase current $i_w$ (t+$t_w$) at the switching timing.

(3-3-2) Correction Control of Voltage Command Values $C_u$, $C_v$, and $C_w$ (Correction Control Part 42)

Figure 8:
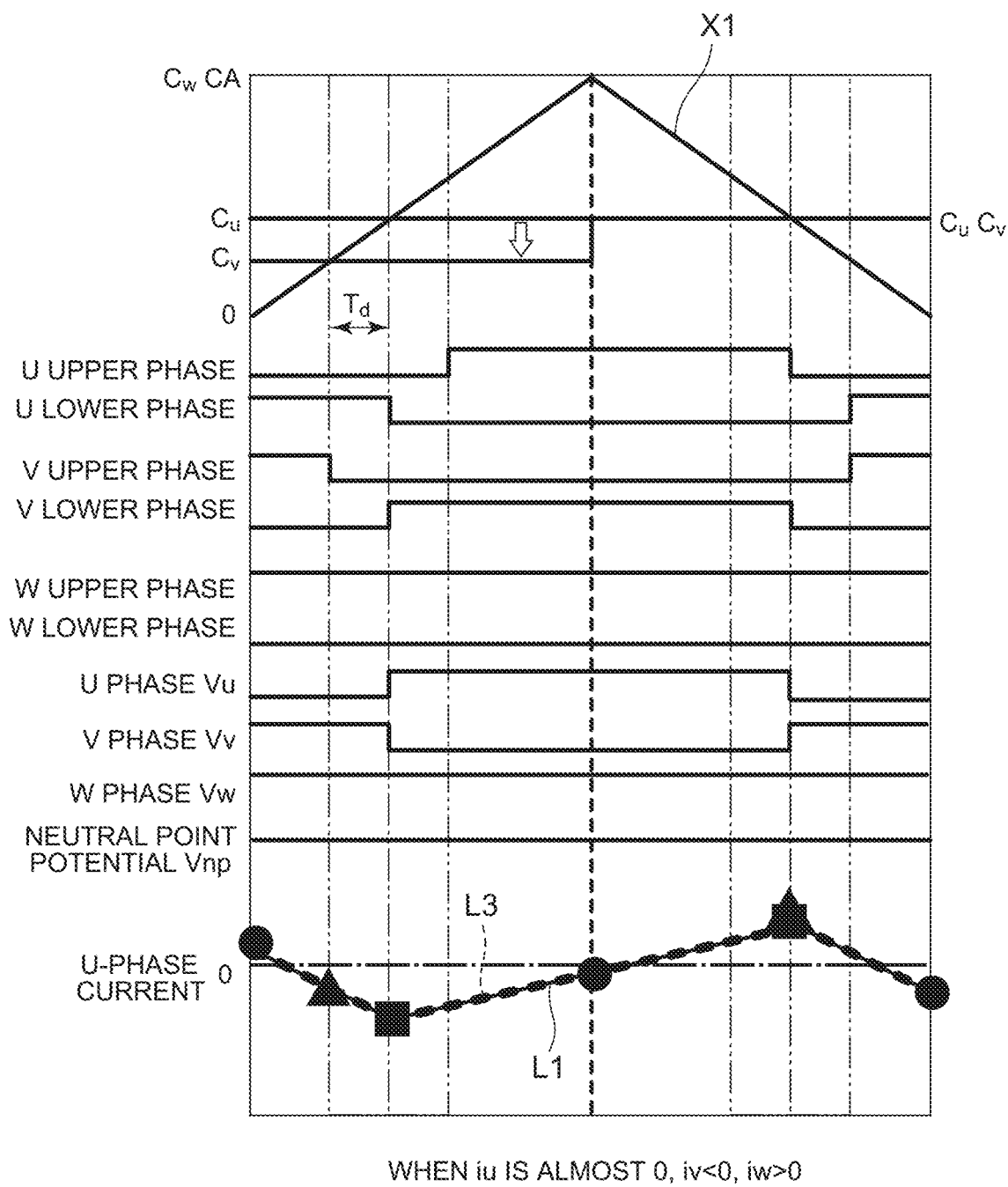
FIG. 8 is a diagram showing corrected voltage command values, a carrier triangular wave, PWM waveforms, phase voltages, a neutral point potential of the motor, and a U-phase current for describing correction control of a control device of FIG. 1 in the case of FIG. 6.

In the embodiment, attention is paid to the phase in which the polarity of the phase current is likely to change between the sampling timing and the switching timing (U phase whose absolute value becomes the smallest in the vicinity of 2 ms in FIG. 3), and the voltage command values $C_u$, $C_v$, and $C_w$ of each phase calculated by the voltage command calculation part 38 are corrected based on the U-phase current $i_u$ (t+$t_u$) at the switching timing predicted by the phase current prediction part 41 as described above. In the example of FIG. 8, the correction control part 42 corrects the V-phase voltage command value $C_v$ (value before correction shown in FIG. 6).

Incidentally, the phase current prediction part 41 may predict the phase currents of all three phases at the switching timing instead of only the phase with the smallest absolute value of the phase current (U phase in the vicinity of 2 ms in FIG. 3). Also, even in FIG. 8, black circles indicate the sampling timings of the phase currents $i_u$, $i_v$, and $i_w$. Black squares indicate the switching timings similar to those in FIG. 6 (switching timings: switching timings before correction) when the U-phase lower arm switching element 18D and V-phase upper arm switching element 18B (first half) and the U-phase upper arm switching element 18A and V-phase lower arm switching element 18E (second half) brought to the ON state by the voltage command values $C_u$, $C_v$, and $C_w$ of each phase calculated by the voltage command calculation part 38 are turned OFF). A black triangle indicates the switching timing at which the V-phase upper arm switching element 18B (first half) after correction by the correction control of the present invention is turned OFF (since the second half is not corrected, the black square and the black triangle are at the same position). Further, a solid line L1 at the bottom shows a change in the U-phase current $i_u$ actually flowing through the motor 8 as described above, and a thick broken line L3 shows the U-phase current $i_u$ (t+$t_u$) predicted by the phase current prediction part 41.

In the case of the example of FIG. 8, the polarity of the U-phase current $i_u$ sampled at the leftmost sampling timing (black circle) was positive (direction thereof flowing into the motor 8: $i_u$>0), but the polarity of the U-phase current $i_u$ (t=$t_u$) at the switching timing (black square) predicted by the phase current prediction part 41 is negative (direction thereof flowing out from the motor 8: $i_u$<0) (the polarity of the V-phase current $i_v$ is also negative). Therefore, in the first half of the carrier cycle, in order to synchronize the timing at which the V-phase lower arm switching element 18E is turned ON with the timing at which the U-phase lower arm switching element 18D is turned OFF, the correct control part 42 corrects only the V-phase voltage command value $C_v$ in the direction of reducing it by $CAT_d/T_s$ (shown with a white arrow in the first half of FIG. 8). Incidentally, $T_s$ is one carrier cycle.

Consequently, since only the switching timing at which the V-phase upper arm switching element 18B is turned OFF shifts from the black square to the black triangle (correction of switching operation), the timing at which the V-phase voltage $V_v$ falls with a delay of the dead time $T_d$ from that time (timing at which the V-phase lower arm switching element 18E is turned ON), and the timing at which the U-phase lower arm switching element 18D is turned OFF so that the U-phase voltage $V_u$ rises, are synchronized with each other, so that the neutral point potential $V_{np}$, does not fluctuate (the first half of FIG. 8).

Thus, in the present invention, since the control device 21 includes the phase current prediction part 41 which predicts the phase current at the switching timing of each phase, and the correction control part 42 which corrects the switching operation so that the change in the phase voltage applied to the motor 8 is canceled by another change in the phase voltage, based on the phase current of each phase at the switching timing predicted by the phase current prediction part 41, it is possible to perform a more accurate correction of the switching operation.

Consequently, it is possible to eliminate the effects of the dead time and accurately cancel the change in the phase voltage with another change in the phase voltage, thereby making it possible to extremely effectively eliminate or suppress the generation of the common mode noise with the fluctuation in the neutral point potential.

In this case, in the embodiment, the control device 21 includes the voltage command calculation part 38 which calculates the voltage command value of each phase. The phase current prediction part 41 predicts the phase current at the switching timing when the upper arm switching elements 18A to 18C or the lower arm switching elements 18D to 18F brought to the ON state by the voltage command value of each phase calculated by the voltage command calculation part 38 are turned OFF, and the correction control part 42 corrects the voltage command value of each phase calculated by the voltage command calculation part 38 based on the phase current of each phase at the switching timing predicated by the phase current prediction part 41 to synchronize the switching timings of the respective phases, thereby eliminating the change in the phase voltage applied to the motor 8 with another change in the phase voltage.

Further, in the embodiment, the control device 21 includes the phase current detection part 39 which samples the phase current of each phase, and the phase current prediction part 41 predicts the phase current of each phase at the switching timing from the phase current sampled by the phase current detection part 39 and the amount of increase or decrease in the phase current from the sampling timing to the switching timing.

In this case, in the embodiment, since the phase current prediction part 41 predicts the phase current of each phase at the switching timing, based on the phase current sampled by the phase current detection part 39, the ON time of the upper arm switching elements 18A to 18C or lower arm switching elements 18D to 18F of each phase, and the back electromotive force of each phase of the motor 8, it is possible to accurately predict the phase current at the switching timing from the sampled phase current.

Specifically, since the phase current prediction part 41 uses the above-described formula (I) (formulas (VI) to (XI)) to predict the phase current at the switching timing, the phase current prediction part 41 is capable of more accurately predicting the phase current at the switching timing.

(3-4) Shift in Switching Timing

Next, description will be made about shift control further performed by the correction control part 42 with reference to FIGS. 9 to 11.

(3-4-1) Changes in Phase Voltages at Switching

Here, as changes in the phase voltages $V_u$, $V_v$, and $V_w$, the slopes thereof actually change depending on the polarities and magnitudes of the phase currents $i_u$, $i_v$, and $i_w$. That is, after the gate voltages of the upper and lower arm switching elements 18A to 18F have changed, the phase voltage starts to change after a certain period of time, and the falling and rising shapes change depending on the polarity and magnitude of the phase current.

Figure 9:
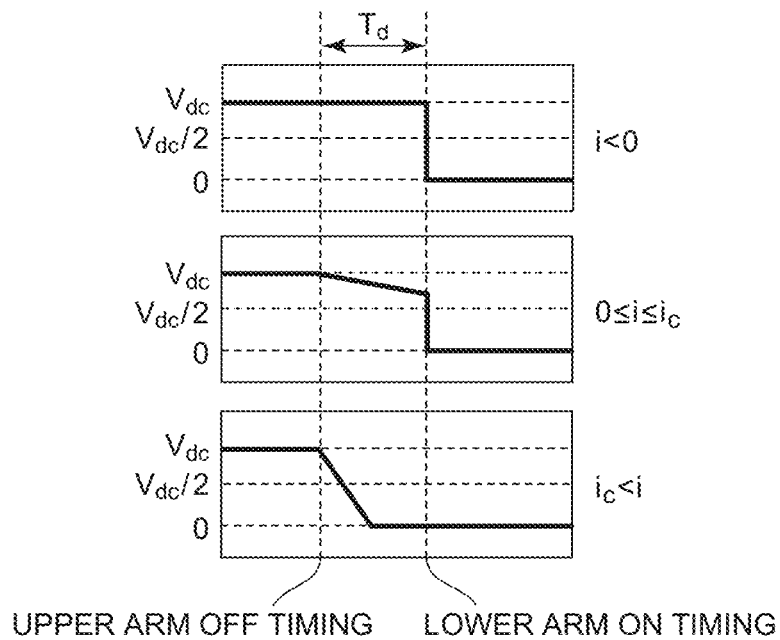
FIG. 9 is a diagram showing actual changes when the phase current falls.
Figure 10:
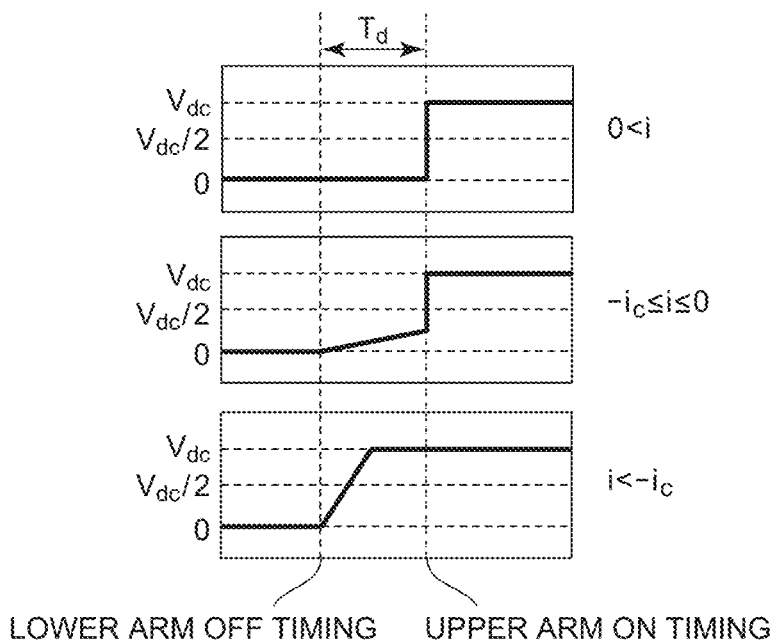
FIG. 10 is a diagram showing actual changes when the phase current rises.

This situation is shown in FIGS. 9 and 10. Incidentally, FIG. 9 shows the operation when the phase voltage falls (the upper arm switching element is turned OFF and the lower arm switching element is turned ON). FIG. 10 shows the operation when the phase voltage rises (the lower arm switching element is turned OFF and the upper arm switching element is turned ON).

Also, in each figure, i is a general term for each phase current, and $i_c$ is a discharge current of the output capacitance of the upper and lower arm switching elements. This discharge current $i_c$ is calculated by the following formula (XII). Incidentally, $C_p$ is the output capacitance of the upper and lower arm switching elements (parasitic capacitance peculiar to semiconductors).

[Math. 13]

$$i_c = \frac{2C_p V_{dc}}{T_d} \quad \text{(XII)}$$

An upper stage of FIG. 9 shows the case where the polarity of the phase current i is negative (i<0). The phase voltage falls almost vertically from the DC link voltage $V_{dc}$ to 0 at the timing when the lower arm switching element is turned ON after the upper arm switching element is turned OFF. A middle stage of FIG. 9 shows the case of $0 \leq i \leq i_c$, where the phase voltage gradually drops after the upper arm switching element is turned OFF, and falls almost vertically toward 0 at the timing when the lower arm switching element is turned ON after the dead time $T_d$. A lower stage of FIG. 9 shows the case of $i_c < i$, where the phase voltage drops at a predetermined angle after the upper arm switching element is turned OFF, and becomes 0 before the dead time $T_d$ elapses.

An upper stage of FIG. 10 shows the case where the polarity of the phase current i is positive (0<i), where the phase voltage rises almost vertically from 0 to the DC link voltage $V_{dc}$ at the timing when the upper arm switching element is turned ON after the lower arm switching element is turned OFF. A middle stage of FIG. 10 shows the case of $-i_c \leq i \leq 0$, where the phase voltage gradually rises after the lower arm switching element is turned OFF, and rises almost vertically toward the DC link voltage $V_{dc}$ at the timing when the upper arm switching element is turned ON after the dead time $T_d$. A lower stage of FIG. 10 shows the case of $i < -i_c$, where the phase voltage rises at a predetermined angle after the lower arm switching element is turned OFF, and becomes the DC link voltage $V_{dc}$ before the dead time $T_d$ elapses.

Figure 11:
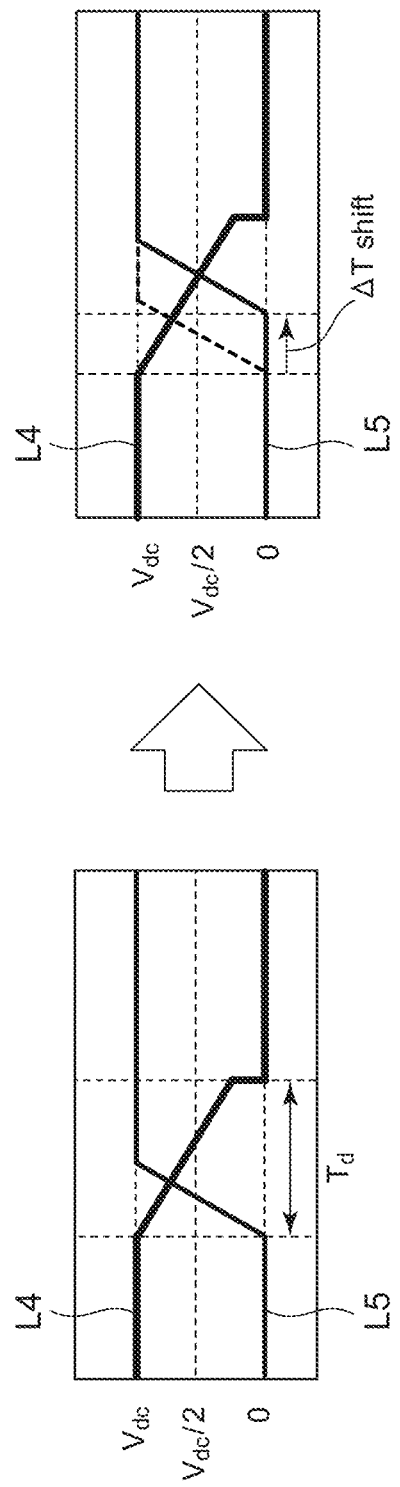
FIG. 11 is a diagram describing shift control of switching timing by the control device of FIG. 1.

For this reason, for example, as shown on the left side of FIG. 11, in the case where the magnitude of the phase current i of the phase falling due to switching is shown in the middle stage of FIG. 9 ($0 \leq i \leq i_c$) and in the case where when a change in the phase voltage (indicated by L4 in FIG. 11) gradually drops after the upper arm switching element is turned OFF, and falls almost vertically toward 0 at the timing when the lower arm switching element is turned ON after the dead time $T_d$, the phase current i of the phase at which the phase voltage rises in order to cancel the change has a magnitude as shown in the lower stage of FIG. 10 ($i < -i_c$), a change in the phase voltage (indicated by L5 in FIG. 11) rises at a predetermined angle after the lower arm switching element is turned OFF, and reaches the DC link voltage $V_{dc}$ before the dead time $T_d$ elapses. Consequently, the phase voltage L4 and the phase voltage L5 cross in a state of being greater than $V_{dc}/2$. Therefore, the neutral point potential becomes easier to fluctuate.

(3-4-2) Shift Control by Correction Control Part 42

Therefore, the correction control part 42 of the control device 21 shifts (delays) the switching timing of the phase of the phase voltage L5 by ΔT so that the phase voltage L4 and the phase voltage L5 cross over at the DC link voltage $V_{dc}/2$ as shown on the right side of FIG. 11. Consequently, the change in the rising phase voltage L5 approaches the change in the falling phase voltage L4, and hence the change in the phase voltage L4 can be more effectively canceled by the change in the phase voltage L5, so that a fluctuation in the neutral point potential is suppressed.

In particular, the correction control part 42 shifts the switching timing of the phase of the phase voltage L5 in which the absolute value of the phase current i is large. This is because the slope of the phase voltage change is less likely to change even if the phase of the phase current i larger in the absolute value is shifted. Consequently, the phase voltage L4 and the phase voltage L5 can be crossed more accurately at the DC link voltage $V_{dc}/2$.

Also, the correction control part 42 does not shift the switching timing for the phase smallest in the magnitude of the absolute value of the phase current i. This is because the phase smallest in the magnitude of the absolute value is the phase in which the phase current i is close to zero A (amperes), among the phase currents of the three phases, and the phase voltage changes as in the middle stages of FIGS. 9 and 10, thus leading to a high possibility that the way in which the phase voltage changes will change due to the shift.

On the other hand, since the phases relatively large in the absolute value of the phase current i (phases other than the intermediate phase) have varying phase voltages as shown in the upper and lower stages of FIGS. 9 and 10, the slopes of the phase voltages are difficult to change even if they are shifted. Consequently, the correction control part 42 shifts the switching timing of the phase largest in the absolute value of the phase current i.

Incidentally, in the example of FIG. 11, the switching timing of the phase in which the phase voltage rises is shifted. However, when the phase largest in the absolute value of the phase current i is the phase in which the phase voltage falls, the switching timing of the phase related to the falling is shifted.

Further, although the embodiment has shown an example of canceling operation in the left-right symmetrical PWM operation using the triangular wave carrier, the effect of the present invention does not depend on the shape of the PWM carrier determined by the used controller (control device), and is also effective in the case where any other carrier signal such as a sawtooth carrier is used. Furthermore, in the embodiment, the present invention has been applied to the case where the current detection is performed at the timings of peaks and troughs of the triangular wave carrier, but the present invention is not limited to the embodiment with respect to the current detection method and the timing. For example, even in the above-described one-shunt current detection method in which the current reading is performed by the PWM operation timing using the single shunt resistor, the effect can be obtained by performing the sequential current estimation and switching timing correction as described in the present application.

Furthermore, in the embodiment, the present invention has been applied to the inverter device which drives and controls the motor of the electric compressor, but the present invention is not limited to it and is effective for drive control of motors of various devices.

DESCRIPTION OF REFERENCE NUMERALS

1 inverter device
8 motor
10 upper arm power supply line
15 lower arm power supply line
18A-18F upper and lower arm switching elements
19U U-phase half bridge circuit
19V V-phase half bridge circuit
19W W-phase half bridge circuit 21 control device
26A, 26B current sensor
28 inverter circuit
33 phase voltage command operation unit
36 PWM signal generation unit
37 gate driver
38 voltage command calculation part
39 phase current detection part
41 phase current prediction part
42 correction control part

The invention claimed is:

1. An inverter device, comprising:
an inverter circuit having an upper arm switching element and a lower arm switching element connected in series for each phase between an upper arm power supply line and a lower arm power supply line, and applying a voltage at a connection point of the upper and lower arm switching elements of each phase to a motor as a three-phase AC output; and
a control device which controls switching of the upper and lower arm switching elements of each phase by providing a dead time,
wherein the control device includes:
a phase current prediction part which predicts a phase current at a switching timing of each phase, and
a correction control part which corrects a switching operation so as to cancel a change in the phase voltage applied to the motor with another change in the phase voltage, based on the phase current of each phase at the switching timing predicted by the phase current prediction part.

2. The inverter device according to claim 1, wherein the control device includes a voltage command calculation part which calculates a voltage command value of each phase,
wherein the phase current prediction part predicts a phase current at a switching timing when the upper arm switching element or the lower arm switching element brought to an ON state by the voltage command value of each phase calculated by the voltage command calculation part is turned OFF, and
wherein the correction control part corrects the voltage command value of each phase calculated by the voltage command calculation part, based on the phase current of each phase at the switching timing predicted by the phase current prediction part and synchronizes the switching timings of each phase to cancel a change in the phase voltage applied to the motor with another change in the phase voltage.

3. The inverter device according to claim 1, wherein the control device includes a phase current detection part which samples the phase current of each phase, and
wherein the phase current prediction part predicts the phase current of each phase at the switching timing from the phase current sampled by the phase current detection part and the amount of increase or decrease in the phase current from a sampling timing provided to sample the phase current to the switching timing.

4. The inverter device according to claim 3, wherein the phase current prediction part predicts the phase current of each phase at the switching timing, based the phase current sampled by the phase current detection part, an ON time of the upper arm switching element or the lower arm switching element of each phase, a back electromotive force of each phase of the motor, a neutral point potential of the motor, and an inductance of each phase of the motor.

5. The inverter device according to claim 4, wherein the phase current prediction part predicts the phase current of each phase at the switching timing using the following formula (I):

[Math. 14]

$$i_{uvw}(t+t_{uvw}) = i_{uvw}(t) + \frac{1}{L_{uvw}}\left\{\frac{\text{sgn}(V_{uvw})V_{dc}}{2} - (e_{uvw}+v_{np})\right\}t_{uvw} \quad (I)$$

where $i_{uvw}$ (t+$t_{uvw}$) indicates the phase currents of the U phase, V phase, and W phase at the switching timing, $t_{uvw}$ indicates the ON times of the upper arm switching elements or lower arm switching elements of the U phase, V phase, and W phase, $i_{uvw}$ (t) indicates the sampled phase currents of the U phase, V phase, and W phase, $L_{uvw}$ indicates the inductances of the U phase, V phase, and W phase of the motor, $V_{dc}$ indicates a DC link voltage, $e_{uvw}$ indicates the back electromotive forces of the U phase, V phase, and W phase of the motor, $V_{np}$ indicates the neutral point potential of the motor, and sgn ($V_{uvw}$) indicates a sign function of each phase voltage, which becomes 1 when the phase voltage is $V_{dc}$ and becomes −1 when the phase voltage is 0.

6. The inverter device according to claim 1, wherein the correction control part shifts the switching timing so that the phase voltage which changes due to switching and another phase voltage which rises or falls to cancel the change in the phase voltage intersect at the DC link voltage $V_{dc}/2$.

7. The inverter device according to claim 6, wherein the correction control part shifts the switching timing of the phase larger in the absolute value of the phase current.

8. The inverter device according to claim 6, wherein the correction control part does not shift the switching timing for the phase smallest in the magnitude of the absolute value of the phase current.

9. The inverter device according to claim 1, wherein the control device includes a phase current detection part which samples the phase current of each phase, and
wherein the phase current prediction part predicts the phase current of each phase at the switching timing from the phase current sampled by the phase current detection part and the amount of increase or decrease in the phase current from a sampling timing provided to sample the phase current to the switching timing.

10. The inverter device according to claim 2, wherein the correction control part shifts the switching timing so that the phase voltage which changes due to switching and another phase voltage which rises or falls to cancel the change in the phase voltage intersect at the DC link voltage $V_{dc}/2$.

11. The inverter device according to claim 3, wherein the correction control part shifts the switching timing so that the phase voltage which changes due to switching and another phase voltage which rises or falls to cancel the change in the phase voltage intersect at the DC link voltage $V_{dc}/2$.

12. The inverter device according to claim 4, wherein the correction control part shifts the switching timing so that the phase voltage which changes due to switching and another phase voltage which rises or falls to cancel the change in the phase voltage intersect at the DC link voltage $V_{dc}/2$.

13. The inverter device according to claim 5, wherein the correction control part shifts the switching timing so that the phase voltage which changes due to switching and another phase voltage which rises or falls to cancel the change in the phase voltage intersect at the DC link voltage $V_{dc}/2$.

14. The inverter device according to claim 7, wherein the correction control part does not shift the switching timing for the phase smallest in the magnitude of the absolute value of the phase current.

\* \* \* \* \*